United States Patent [19]

Ochiai

[11] Patent Number: 5,580,123
[45] Date of Patent: Dec. 3, 1996

[54] SUN-ROOF DEVICE

[75] Inventor: Hironori Ochiai, Chiryu, Japan

[73] Assignee: Aisin Seiki Kabushiki Kaisha, Japan

[21] Appl. No.: 316,426

[22] Filed: Sep. 30, 1994

[30] Foreign Application Priority Data

Oct. 1, 1993 [JP] Japan .................................. 5-247127

[51] Int. Cl.$^6$ ................ B60J 7/185; B60J 7/05
[52] U.S. Cl. ............ 296/223; 296/221; 296/224
[58] Field of Search ................... 296/223, 221, 296/224

[56] References Cited

U.S. PATENT DOCUMENTS

| 4,650,243 | 3/1987 | Hanley et al. | 296/224 |
| 4,974,902 | 12/1990 | Huiyer | 296/224 X |
| 5,326,149 | 7/1994 | Schlapp | 296/224 |

FOREIGN PATENT DOCUMENTS

| 1-55124 | 11/1989 | Japan . | |
| 117418 | 5/1990 | Japan | 296/221 |
| 127124 | 5/1990 | Japan | 296/221 |
| 2113460 | 7/1984 | United Kingdom | 296/221 |

*Primary Examiner*—Dennis H. Pedder
*Attorney, Agent, or Firm*—Finnegan, Henderson, Farabow, Garrett & Dunner

[57] ABSTRACT

A sun-roof device for opening and closing a roof opening of a vehicle body includes a pair of rails secured to inner peripheries of the opened portion of the vehicle body so as to extend along a lengthwise direction thereof; a pair of driving shoes slidably mounted in the pair of rails; a pair of link mechanisms associated with the pair of driving shoes; a pair of driven shoes slidable mounted in the pair of rails, and associated with the pair of driving shoes; a roof panel supported by the pair of driven shoes and the pair of link mechanisms; a pair of check members associated with the pair of driven shoes and engageable and disengageable with the pair of rails through notches formed in the rails, such that when the pair of check members are in engagement with the pair of rails, the panel is permitted to establish a tilt-movement and when the pair of check members are out of engagement with the pair of rails, the panel is permitted to establish a movement along the pair of rails; and a pair of cam profiles for establishing continual sliding engagements of the pair of the check members with the pair of driving shoes, and causing the check members to move into the notches to engage the rails.

10 Claims, 4 Drawing Sheets

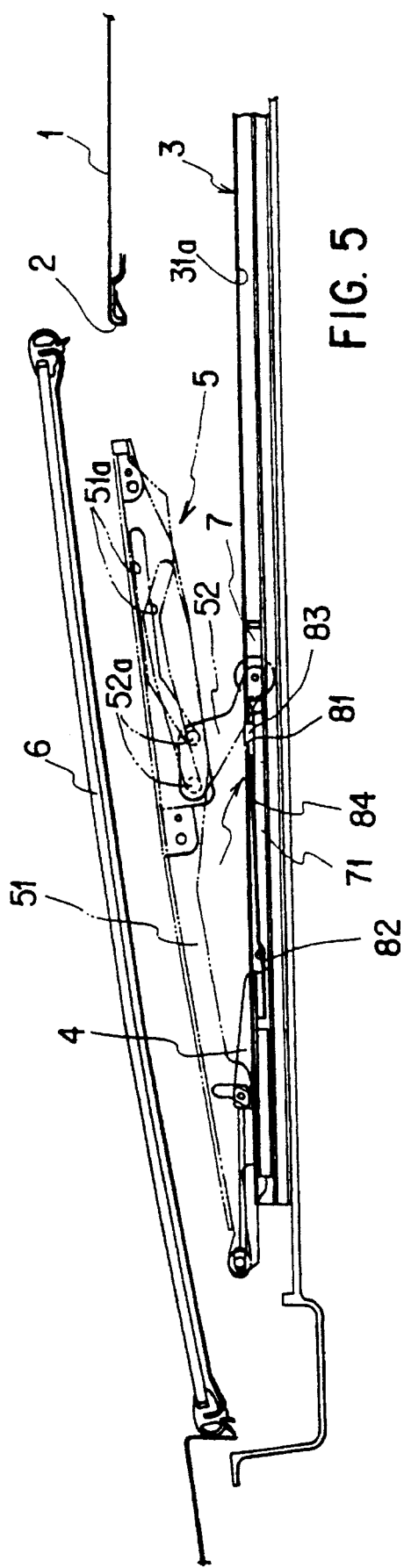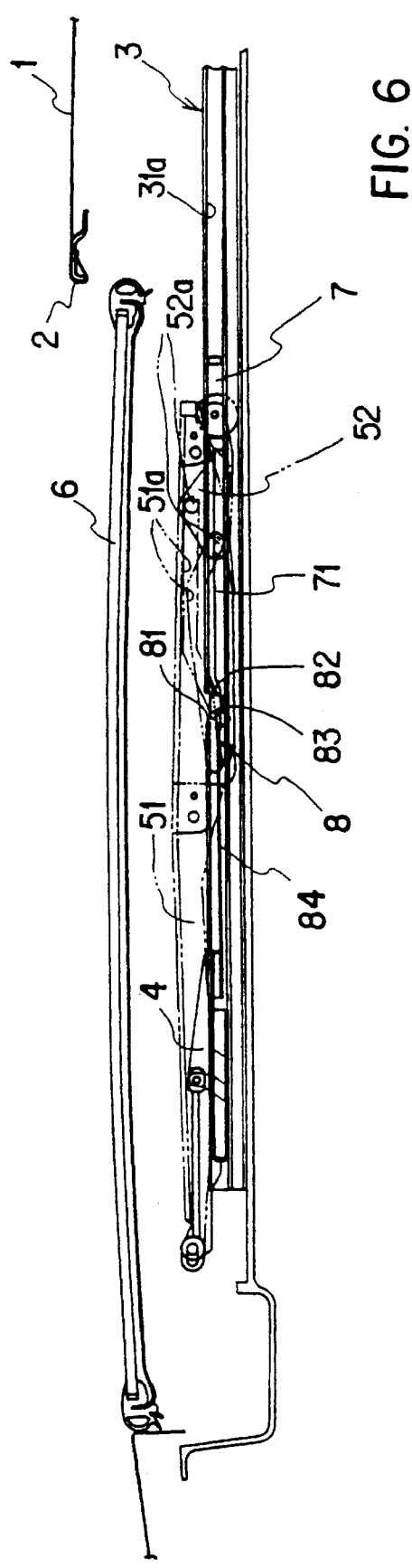

SUN-ROOF DEVICE

BACKGROUND OF THE INVENTION

The present invention relates to a sun-roof device, and in particular to a sun-roof device in which a panel is set to establish a tilt movement and a sliding movement along a rail.

One of the conventional sun-roof devices is disclosed in Japanese Patent Publication No. Hei 1-55124 published on Nov. 22, 1989 after examination. In this conventional device, while a movable panel is in a tilt movement, a driven shoe is set to be immovable relative to a rail by an indirect engagement with the rail via a check member. If it is desired to establish sliding movement of the panel along the rail, the check member is brought into engagement with a driving shoe.

However, since the check member is continually urged by a spring toward the rail, whenever the check member is brought into engagement with the rail, an unpleasant collision noise is generated.

SUMMARY OF THE INVENTION

It is, therefore, a principal object of the present invention is to provide a sun-roof device without the foregoing drawback.

Another object of the present invention is to provide a sun-roof device in which a check member is brought into engagement with the rail in silence.

In order to attain the foregoing objects and in accordance with the purpose of the invention, as embodied and broadly described herein, a sun-roof device for opening and closing an opened portion of a vehicle body is comprised of a pair of rails including grooves secured to inner peripheries of the opened portion of the vehicle body so as to extend along a lengthwise direction thereof and each rail has a notch formed therein; a pair off driving shoes slidably mounted in the pair of rails, respectively; a pair of link mechanisms connected with the pair of driving shoes, respectively; a pair of driven shoe slidably mounted in the pair of rails, respectively, and associated with the pair of driving shoes; a panel connected to the pair of driven shoes and the pair of link mechanisms; a pair of check members disposed in the grooves and connected to the pair of driven shoes, respectively for engagement and disengagement with the pair of rails, respectively at their respective notches such that when the pair of check members are in engagement with the pair of rails, respectively, the panel is permitted to establish a tilt-movement as well as when the pair of check members are out of engagement with the pair of rails, respectively, the panel is permitted to establish a movement along the pair of rails; and a pair of cam profiles connected to the pair of driving shoes, respectively, and in vertical contact with the pair of check members, respectively, to cause vertical movement of the check members into their respective notches and engagement with the pair of rails.

BRIEF DESCRIPTION OF THE DRAWINGS

The above and other objects, features and advantages of the present invention will be more apparent and more readily appreciated from the following detailed description of the preferred exemplary embodiment of the present invention, taken in connection with the accompanying drawings, in which;

FIG. 5 is a side view of a tilt-up condition of the sun-roof device shown in FIG. 1;

FIG. 6 is a side view of a tilt-down condition of the sun-roof device shown in FIG. 1;

DESCRIPTION OF A PREFERRED EMBODIMENT

A preferred embodiment of the present invention will be described hereinunder in detail with reference to the accompanying drawings.

Figure 1:
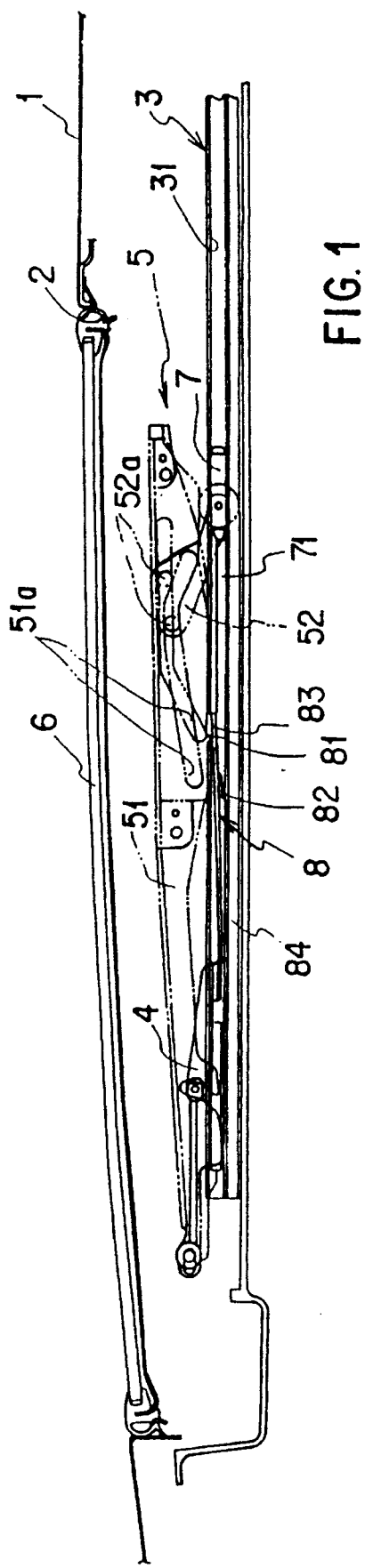
FIG. 1 is a side view of a sun-roof device in accordance with the present invention.
Figure 2:
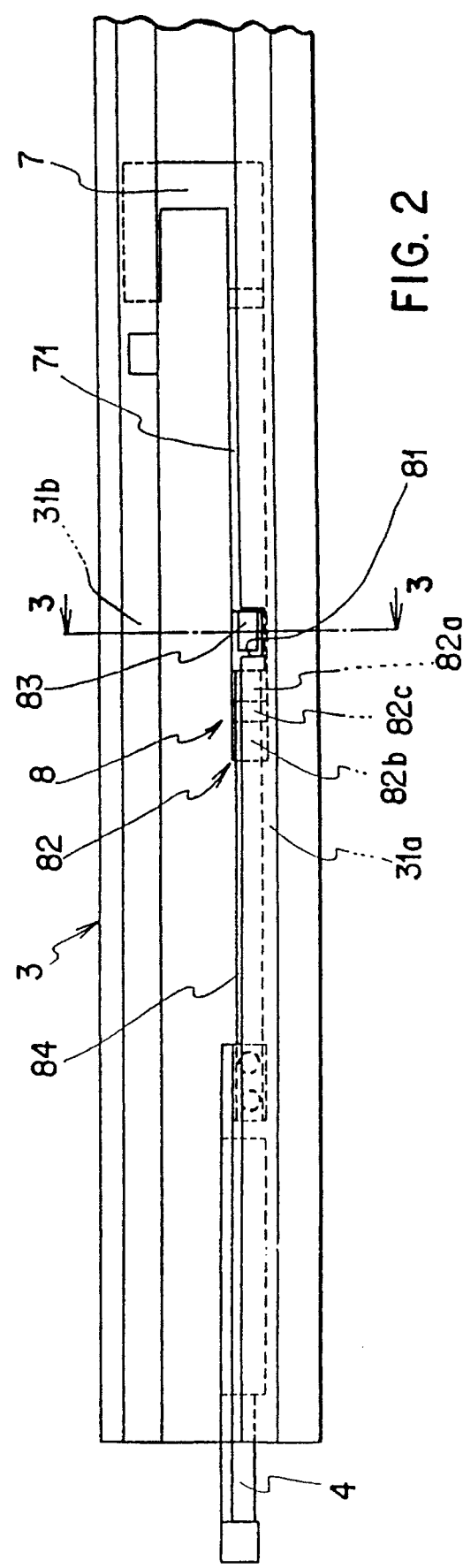
FIG. 2 is a plan view of a check mechanism which constitutes a principal portion of the present invention.
Figure 3:
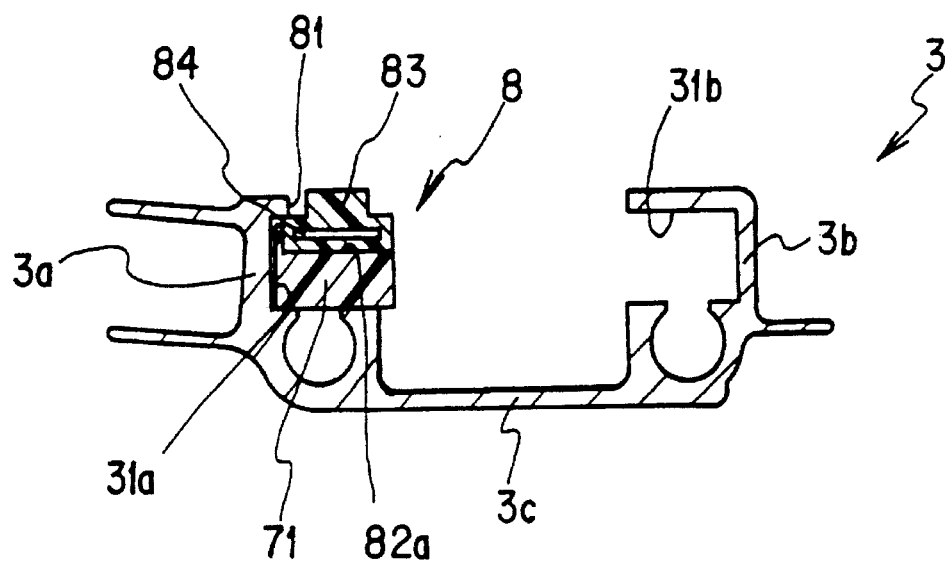
FIG. 3 is a cross-sectional taken along line 3—3 in FIG. 2.

Referring first to FIGS. 1 to 3 inclusive, a vehicle roof panel 1 is provide therein with a rectangular opening or opened portion 2 which has a pair of laterally spaced inner peripheral portions extending in the vehicle lengthwise direction. A guide rail 3 is secured to the roof panel 1 so as to be positioned along each of the inner peripheral portions of the opening 2. A movable panel 6 is supported by the guide rail 3 via a link mechanism 5 including a support link 51 and lift link 52. As will be understood from the later explanation, the movable panel 6 is expected to be moved by an actuation of the link mechanism 5 for opening anal closing the opening 2.

The guide rail 3, which extends in the longitudinal direction of the vehicle roof panel 1, is in the form of a substantially channel shaped body having a pair of laterally spaced side walls 3a and 3b and a bottom wall 3c positioned therebetween. The side walls 3a and 3b are formed therein with guide grooves 31a and 31b, respectively, each of which extends in the longitudinal direction of the vehicle roof panel 1.

A front shoe 4 is in sliding engagement with the guide groove 31a. A rear shoe 7 is in sliding engagement with both of the guide grooves 31a and 31b. A front end of the support link 51 is pivotably connected to the front shoe 4 and a rear end of the lift link 52 is pivotably connected to the rear shoe 7. It is to be noted that the support link 51 is in operative association with the lift link 52 in such a manner that a pair of pins 52a which are secured to a front end of the lift link 52 are in sliding engagement with a respective pair of cam grooves 51a of the support link 51 which are formed at its rear end. The rear shoe 7 is operatively connected via a cable (not shown) to a driving mechanism not shown).

As seen from FIGS. 1 through 4, a check mechanism 8 is provided in the groove 31a. The check mechanism 8 is constituted by a notch portion 81, a cam profile 82 and a check member 83 which will be detailed later.

The notch 81 is formed in an upper portion of the side wall 3a so as to open inside the groove 31a. The cam profile 82 is formed on an extension portion 71 of the rear shoe 7. The cam profile 82 has a first flat portion 82a, a second flat portion 82b which is lower in level than the first flat portion 82a, and a slant portion 82c positioned therebetween. The slant portion 82c provides a continuous relationship or connection of the first flat portion 82a to the second flat portion 82b. It is to be noted that the extension 71 can be constituted as a member which is separated from the rear shoe 7 as long as an operative relationship is being established therebetween. The check member 83 is mounted on the upper surface of the extension portion 71 of the rear shoe 7 so as to be brought into engagement or disengagement with the notch portion 81. The check member 83 is connected via a connecting plate 84 to the front shoe 4. The connecting plate 84 urges the check member 83 in the downward direction for maintain a continuous sliding engagement of the check member 83 with the cam profile 82. The connecting plate 84 has an elasticity which permits it to follow the engagement and disengagement of the check member 83 with the notch portion 81.

Figure 4:
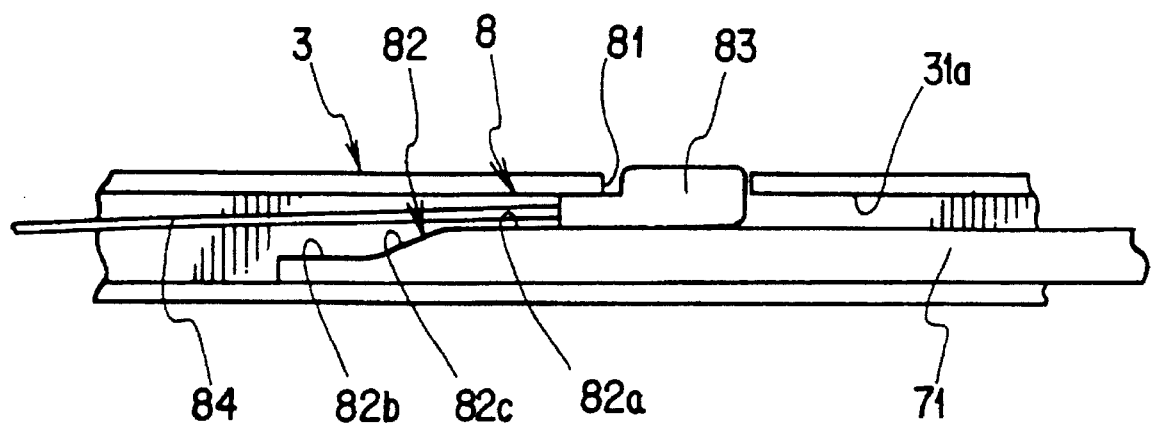
FIG. 4 is a side view of the check mechanism.

In FIG. 1, the movable panel 6 is at its closed position and the opening 2 is thereby in its a closed condition. In FIGS. 3 and 4, the check member 83, while the movable panel 6 takes its closed position, in engagement with the notch portion 81 and is in sliding engagement with the first flat portion 82a of the cam profile 82, which prevents or inhibits a movement of the front shoe 4 along the groove 31a.

Under such a condition, when the rear shoe 7 is moved by the driving means in the frontward direction of the vehicle body, the lift link 52 is brought into counter-clockwise rotation or raising movement by the mutual actuation of the cam groove 51a and the pins 52a, thereby establishing a tilt-up movement of the support link 51. Thus, as shown In FIG. 5, the movable panel 6 is brought into the opened position or tilt-up condition, thereby opening the opened portion 2. Under such condition, when the rear shoe 7 is moved in the rear-ward direction, the movable panel 6 is returned to its closed position as shown in FIG. 1. During this tilt movement of the movable panel 6, the front shoe 4 remains immovable due to the reliable engagement between the check member 83 and the notch portion 81a which is established by the sliding movement of the check member 83 with the first flat portion 82a of the cam profile 82. Thus, an unexpected interference of the movable panel 6 with the roof panel 1 can be prevented.

Under the condition shown in FIG. 1, when the rear shoe 7 is moved in the rearward direction, the lift link 52 is brought into clockwise rotation or lowering movement by the mutual actuation of the cam groove 51a and the pins 52a, thereby establishing a lowering movement of the support link 51. Thus, as shown in FIG. 6, the movable panel 6 is brought into the lowermost position, thereby opening the opened portion 2. During this tilt-down movement of the movable panel, the front shoe 4 remains immovable due to the reliable engagement between the check member 83 and the notch portion 81 which is established by the sliding movement of the check member 83 with the first flat portion 82a of the cam profile 82.

Figure 7:
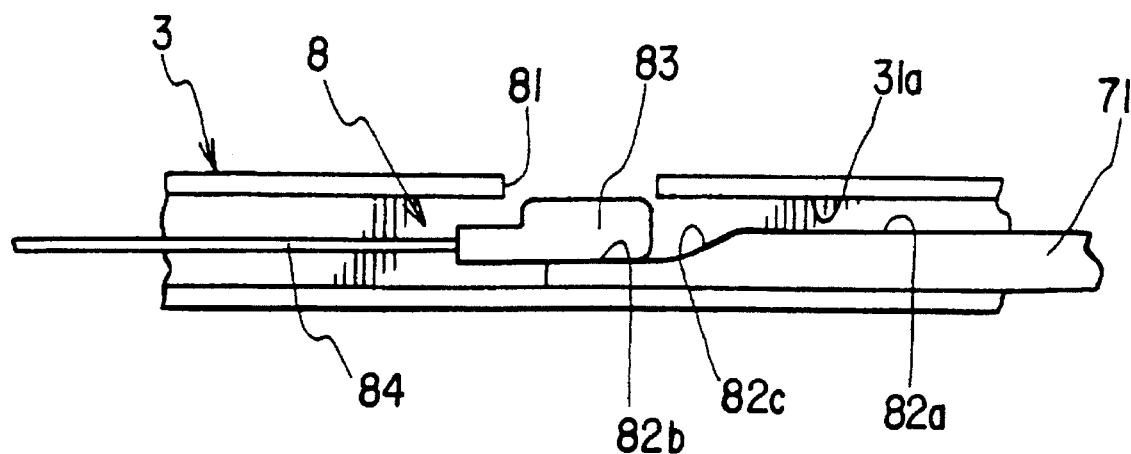
FIG. 7 shows an operation of the check mechanism when the sun-roof device takes a condition shown in FIG. 4.
Figure 8:
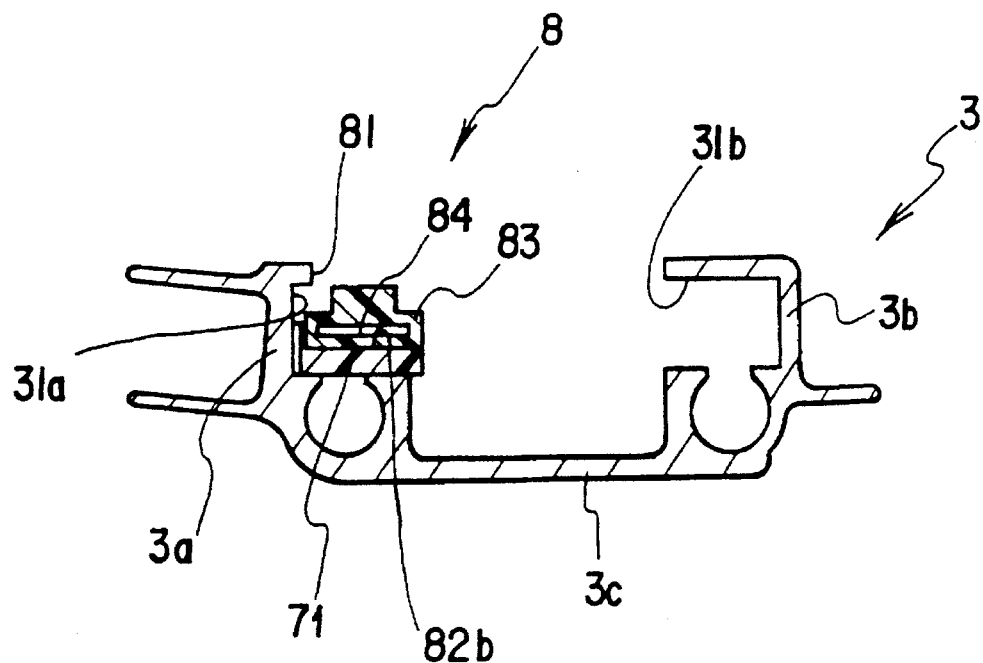
FIG. 8 shows another operation of the check mechanism when the sun-roof device takes a condition shown in FIG. 3.

When the movable panel 6 is brought into its lowermost position, as shown in FIGS. 7 and 8, the check member 83 is brought into engagement with the second flat portion 82b. Since the check member 83 is being urged in the downward direction by the connecting plate 84, the check member 83 is moved away from the notch portion 81, thereby establishing the disengagement between the check member 83 and the notch portion 81. Thus, the front shoe 4 is brought into movable condition along the rail 31a. During the lowering movement of the movable panel 6 from the position shown in FIG. 4 to the position shown in FIG. 7, the sliding movement of the check member 83 on the slant portion 82c is established, thereby assuring a gradual silent downward movement of the check shoe 83.

Thereafter, when the rear shoe 7 is moved in the rearward direction, both of the front shoe 4 and the check member 83 are brought into rearward movement. The movable panel 6 which is in its lowermost position is moved in the rearward direction, thereby opening the opened portion 2. At this time, the front shoe 4 is moved concurrently with the rear shoe 7, and therefore the check member 83 remains on the second flat portion 82b of the cam profile 82. When an operation which is contrary to the previous operation is established, the opening portion 2 can be closed by the movable panel 6.

As mentioned above, because of the continual sliding engagement of the check member 83 with the cam profile 82 of the extension 71 of rear shoe 7 there is, no interference between other members such as the rear shoe 7, thereby resulting in prevention of noise generation. Since only the movement of the cam profile 82 establishes the engagement and disengagement of the check member 83 with the notch portion 81, any force such as a vibration transmitted to the check member 83 fails to effect the relationship thereof to the notch portion 81.

The invention has thus been shown and described with reference with reference to a specific embodiment, however, it should be noted that the invention is in no way limited to the details of the illustrated structures but changes and modifications may be made without departing from the scope of the appended claims.

What is claimed is:

1. A sun-roof device for opening and closing an opened portion of a vehicle body, comprising:

a pair of rails including grooves and secured to inner peripheries of the opened portion of the vehicle body so as to extend along a lengthwise direction thereof, each rail having a notch formed therein;

a pair of driving shoes slidably mounted in the pair of rails, respectively;

a pair of link mechanisms connected with the pair of driving shoes, respectively;

a pair of driven shoes slidably mounted in the pair of rails, respectively;

a panel connected to the pair of driven shoes and the pair of link mechanisms;

a pair of check members disposed, each disposed in one of the grooves of the pair of rails and connected to the pair of driven shoes, respectively, for engagement and disengagement with the pair of rails, respectively, at their respective notches, such that when the pair of check members are in engagement with the pair of rails, respectively, the panel is permitted to establish a tilt-movement, and when the pair of check members are out of engagement with the pair of rails, respectively, the panel is permitted to establish a movement along the pair of rails; and a pair of cam profiles connected to the pair of driving shoes, respectively, and in vertical contact with the pair of check members, respectively, to cause upward vertical movement of the check members into their respective notches and engagement with the pair of rails.

2. A sun-roof device in accordance with claim 1, wherein each of the cam profiles includes a first flat portion, a second flat portion which is vertically disposed below the first flat portion and a slant portion positioned therebetween.

3. A sun-roof device in accordance with claim 1, wherein each of the driven shoes is connected to a respective check member via a connecting plate.

4. A sun-roof device in accordance with claim 3, wherein the connecting member is elastically biased for urging the check plate on the cam profile.

5. A sun-roof device for opening and closing a roof opening in a vehicle, comprising:

a pair of rails secured to inner peripheries of the vehicle body adjacent the roof opening so as to extend along a lengthwise direction thereof;

a pair of driving shoes slidably mounted in the pair of rails, respectively;

a pair of link mechanisms connected with the pair of driving shoes, respectively;

a pair of driven shoes slidably mounted in the pair of rails, respectively;

a panel connected to the pair of driven shoes and the pair of link mechanisms;

a pair of check members connected to the pair of driven shoes, respectively, for engagement and disengagement with a portion of the pair of rails, respectively, such that when the pair of check members are in engagement with the portion of the pair of rails, the driven shoes are prevented from movement, and when the pair of check members are out of engagement with the portion of the pair of rails, the driven shoes and panel are permitted to move along the pair of rails; and a pair of cam profiles respectively connected to the pair of driving shoes and in continual sliding contact respectively with the pair of check members, each of the cam profiles including a first flat portion at a first level, a second flat portion at a second level, and a slant portion between the flat portions.

6. A sun-roof device in accordance with claim 5 wherein the second level is vertically displaced below the first level.

7. A sun-roof device for opening and closing an opened portion of a vehicle body, comprising:

a pair of rails including grooves and secured to inner peripheries of the opened portion of the vehicle body so as to extend along a lengthwise direction thereof, each rail having a notch formed therein;

a pair of driving shoes slidably mounted in the pair of rails, respectively;

a pair of link mechanisms connected with the pair of driving shoes, respectively;

a pair of driven shoes slidably mounted in the pair of rails, respectively;

a panel connected to the pair of driven shoes and the pair of link mechanisms;

a pair of check members, each disposed in one of the grooves of the pair of rails and connected to the pair of driven shoes, respectively, for engagement and disengagement with the pair of rails, respectively, at their respective notches, such that when the pair of check members are in engagement with the pair of rails, respectively, the panel is permitted to establish a tilt-movement, and when the pair of check members are out of engagement with the pair of rails, respectively, the panel is permitted to establish a movement along the pair of rails; and a pair of cam profiles each of which is disposed on one of its respective driving shoe and check member and is in contact with the other of its driving shoe and check member in the vertical direction to cause vertical movement of the check member into its respective notch and engagement with its respective rail.

8. A sun-roof device in accordance with claim 7 wherein each of the cam profiles includes a first flat portion at a first level, a second flat portion at a second level, and a slant portion between the flat portions.

9. A sun-roof device in accordance with claim 8 wherein the vertical movement is an upward movement.

10. A sun-roof device for opening and closing an opened portion of a vehicle body, comprising:

a pair of rails including grooves and secured to inner peripheries of the opened portion of the vehicle body so as to extend along a lengthwise direction thereof, each rail having a notch formed therein;

a pair of driving shoes slidably mounted in the pair of rails, respectively;

a pair of link mechanisms connected with the pair of driving shoes, respectively;

a pair of driven shoes slidably mounted in the pair of rails, respectively;

a panel connected to the pair of driven shoes and the pair of link mechanisms;

a pair of check members, each disposed in one of the grooves of the pair of rails and connected to the pair of driven shoes, respectively, for engagement and disengagement with the pair of rails, respectively, at their respective notches, such that when the pair of check members are in engagement with the pair of rails, respectively, the panel is permitted to establish a tilt-movement, and when the pair of check members are out of engagement with the pair of rails, respectively, the panel is permitted to establish a movement along the pair of rails; and a pair of cam profiles connected to the pair of driving shoes, respectively, and in vertical contact with the pair of check members, respectively, to cause vertical movement of the check members into their respective notches and engagement with the pair of rails.

* * * * *